Aug. 13, 1968  W. P. HOVORAK  3,396,481
EARTHMOVING MACHINE

Filed Sept. 23, 1965  5 Sheets-Sheet 1

INVENTOR.
WILLIAM P. HOVORAK
BY John H. Widdowson
ATTORNEY

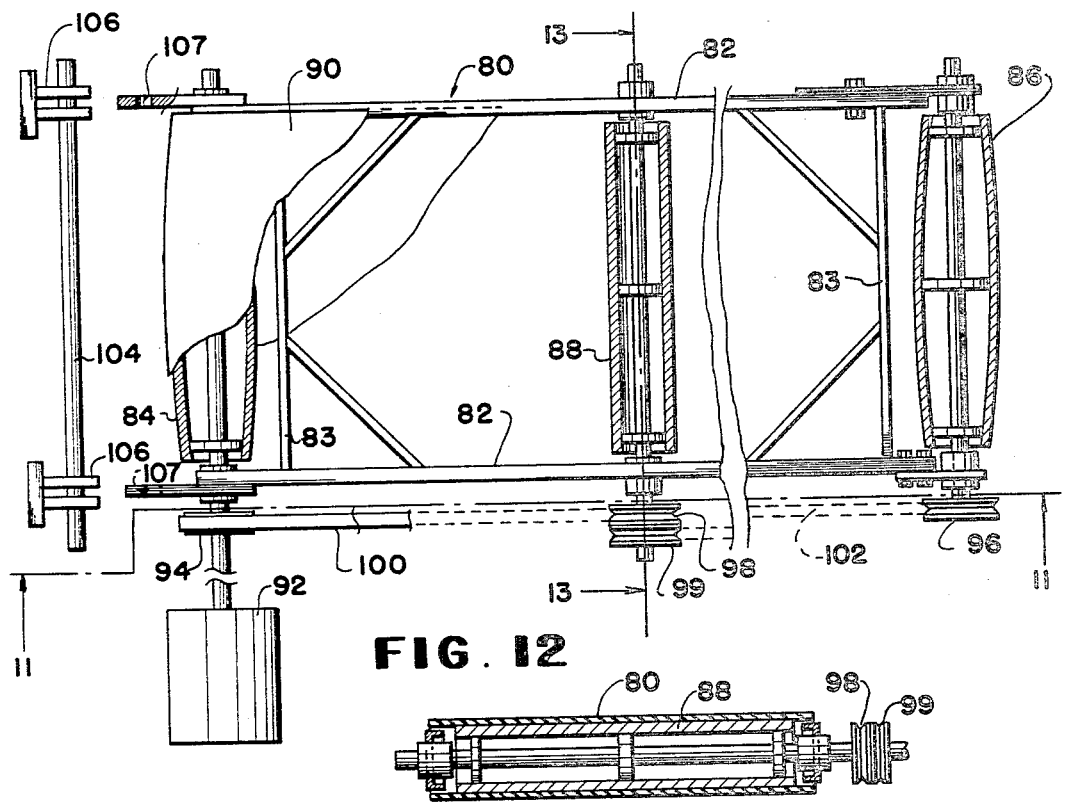

Aug. 13, 1968     W. P. HOVORAK     3,396,481
EARTHMOVING MACHINE

Filed Sept. 23, 1965     5 Sheets-Sheet 5

INVENTOR.
WILLIAM P. HOVORAK

BY *John H. Widdowson*
ATTORNEY 3,396,481
EARTHMOVING MACHINE
William P. Hovorak, 1023 W. 16th,
Wellington, Kans. 67152
Filed Sept. 23, 1965, Ser. No. 489,518
11 Claims. (Cl. 37—108)

ABSTRACT OF THE DISCLOSURE

An earthmoving or terracing apparatus is provided with a frame, having horizontally spaced portions, which is supported by wheel means which can be raised or lowered to adjust the height of the frame. A blade is mounted on the frame and a means is provided for adjusting the height of the blade. An inclined elevator means is positioned by the spaced portions of the frame so that the lower end of the inclined elevator is positioned adjacent the blade. A transverse conveyor is positioned rearwardly of the inclined elevator and is adapted to receive material therefrom. At least one delivery conveyor is mounted on the frame and positioned so as to receive material from the transverse conveyor and transfer the material outwardly away from the apparatus.

---

This invention relates to earthmoving, more particularly to terracing. More specifically, the invention relates to earthmoving apparatus, still more specifically to a terracing apparatus in the nature of a wheeled container having a scraper blade adapted to be lowered into engagement with the earth to thereby scrape earth into the container on forward movement thereof for transport to and discharge at a generally transverse location relative to the blade.

Earthmoving machines known to the prior art provided with a scraper type blade movably mounted on a wheeled container are in operation loaded by forward movement, the resultant load transported to another location, and the load then dumped. When such machines are used in terracing operations, the wheeled container must first be loaded by moving it with the blade in scraping position over a given distance. After the container is filled the machine must again be moved over a given distance as the load is slowly released and spread out. In terracing operations the dumping or unloading area is normally parallel to and spaced transversely only a short distance from the loading area.

While this type of machine is desirable in general since it is capable of removing relatively thin wide layers of earth, a separate run must be made to dump the earth. The separate loading and unloading operation takes valuable time and thereby decreases the overall productivity of this type of machine in terracing operations. Also frequently the dumping or spreading of the earth should desirably be concentrated in a relatively narrow pattern, which spreading cannot be readily accomplished with this general type of machine.

Ditching and grading machines are known that are capable of simultaneously scraping up earth, transporting it transversely, and then dumping it. These machines have not been satisfactory in terracing operations and have therefore not enjoyed any large degree of popularity. These machines are generally very cumbersome, expensive to own and operate, and not sufficiently maneuverable for terracing operations. The earth is normally removed in narrow thick widths, which is undesirable since it does not allow adequate control over the removal, separation and placement of the topsoil and subsoil. Also these known type ditching and grading machines could not handle heavy, sticky, or damp earth, such as damp clay type soil.

I have invented a new earthmoving apparatus which is particularly suited for terracing operations. The earthmoving apparatus of my invention has a frame having generally spaced portions and wheel means. A blade is positioned between the spaced portions of the frame, and a means is provided for adjusting the height of the blade. An inclined elevator means is positioned between the spaced portions of the frame with a lower end positioned adjacent the blade. A transverse conveyor is provided to move material delivered by the inclined conveyor transversely of the frame. At least one delivery conveyor is mounted on the frame to receive material from the transverse conveyor. The apparatus of my invention is adapted in use to pick up earth or the like with the blade and inclined conveyor as the apparatus is moved forward, deposit same on the transverse conveyor, and deliver the earth transverse to said frame with the transverse conveyor and delivery conveyor.

The earth moving apparatus of my invention solves all of the problems common to known apparatus used to perform terracing operations. The apparatus of my invention in operation simultaneously scrapes up earth and continuously and evenly spreads it at a transverse location. Since the loading and unloading operations are performed simultaneously, there is no need for separate loading and unloading runs, which use valuable time and decrease productivity. The apparatus of my invention is capable of handling heavy or damp sticky soils, such as clay, which greatly increases its patented scope of use and practical operating time, as compared to known ditching and grading apparatus. Still further, the apparatus of my invention is very maneuverable and efficient in operation. It is also capable of removing soil in wide thin layers, and depositing it in relatively thick concentrated layers, if such is desired. This feature makes possible a very precise selection and placement control of the topsoil and subsoil, which is important in terracing operations.

An object of this invention is to provide a new earth moving apparatus.

Another object of this invention is to provide new earthmoving apparatus which is particularly adapted for terracing operations.

Yet another object of this invention is to provide a new terracing machine which simultaneously loads and unloads earth.

Another object of this invention is to provide a new terracing apparatus which is capable of handling heavy or sticky soil, such as clay.

Another object of this invention is to provide a new terracing apparatus which provides a greater degree of control over the selection, width, and thickness of the layer of soil being removed and deposited.

Still another object of this invention is to provide a new earth moving apparatus that is highly maneuverable and efficient in operation.

Yet another object of this invention is to provide an earth moving apparatus that is relatively easy and simple to operate and maintain.

Still another object of this invention is to provide a new terracing apparatus which can be readily adapted to meet varying operating conditions.

Various other objects, advantages, and features of the invention will become apparent to those skilled in the art from reading this disclosure.

Drawings accompany and are a part of this disclosure. These drawings depict preferred specific embodiments of the earth moving apparatus of the invention, and it is to be understood that these drawings are not to unduly limit the scope of the invention.

In the drawings:

FIG. 11 is a side elevational view of a preferred specific embodiment of an elevator conveyor used in the earthmoving apparatus of my invention.

FIG. 12 is a top plan view in broken section of the conveyor illustrated in FIG. 11.

FIG. 13 is a cross sectional view taken on line 13—13 of FIG. 12.

Figure 1:
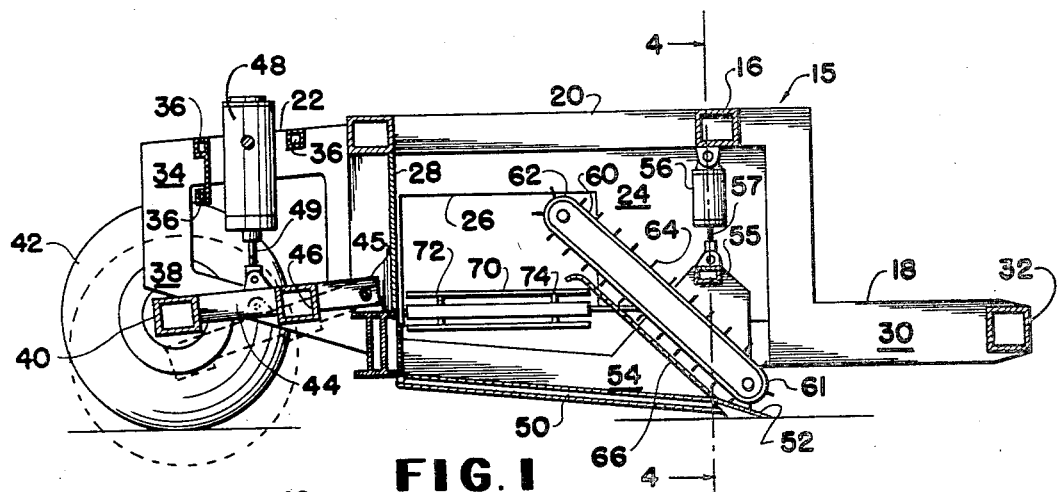
FIG. 1 is a side elevational view in cross section of a preferred specific embodiment of the earthmoving apparatus of my invention.
Figure 2:
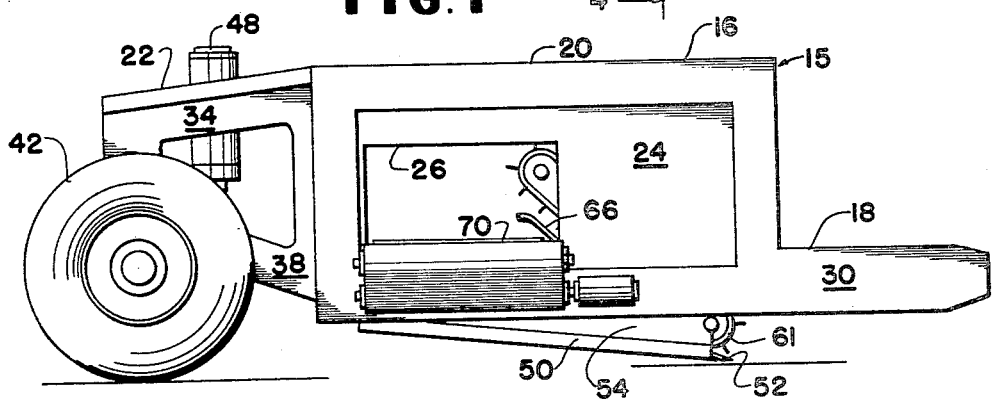
FIG. 2 is a side view of the preferred specific embodiment of the earthmoving apparatus of my invention illustrated in FIG. 1.
Figure 3:
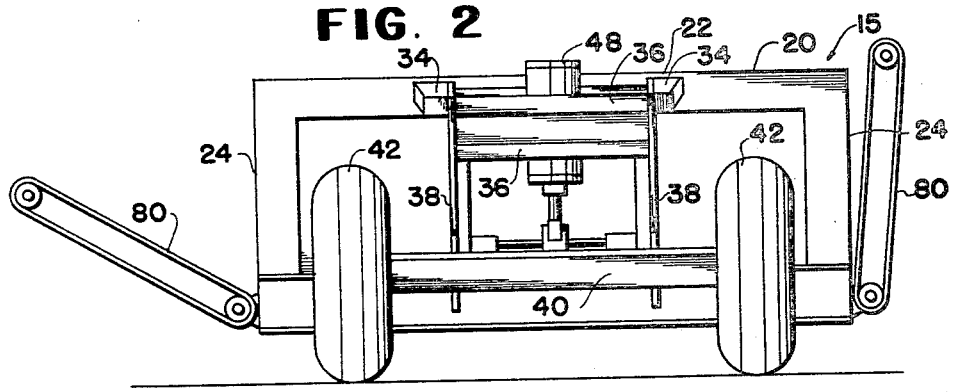
FIG. 3 is a rear elevational view of the preferred specific embodiment of my invention illustrated in FIGS. 1 and 2.
Figure 4:
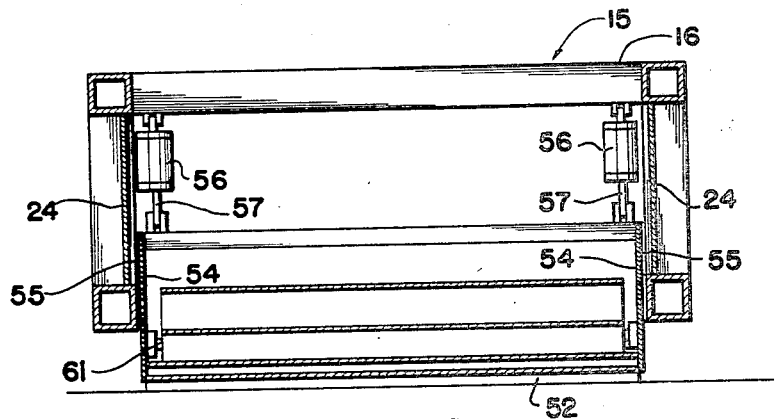
FIG. 4 is a cross sectional view taken on line 4—4 of FIG. 1.

In the following is a discussion and description of the invention made with reference to the drawings, wherein the same reference numerals are used to indicate the same or similar parts and/or structure. The discussion and description is of preferred specific embodiments of the new earthmoving apparatus of the invention, and it is to be understood that the discussion and description is not to unduly limit the scope of the invention.

Referring now to the figures of the drawings there is depicted in FIGS. 1–4 a preferred specific embodiment 15 of the terracing or earthmoving apparatus of my invention. The earthmoving apparatus 15 is a vehicle drawn apparatus particularly adapted for terracing operations. The terracing apparatus 15 has a frame 16 having front 18, intermediate 20, and rear portions 22. The intermediate portion 20 of frame 16 has spaced sidewalls 24 provided with rectangular openings 26 therein. Frame portion 20 is also provided with a rear wall 28. The intermediate portion 20 is open at the top and lower front end, and is preferably constructed of heavy steel beams having a rectangular or square cross section as most clearly illustrated in FIG. 1 of the drawings. The front portion 18 of frame 16 has two spaced forwardly extending beams 30 joined to the front of intermediate portion 20, and a transverse beam 32 forming with beams 30 a drawbar for operative connection to a pulling vehicle. The rear portion 22 of frame 16 has spaced and parallel rearwardly extending members 34 with transversely extending reinforcing beams 36 welded therebetween. Rearwardly extending beams 34 are preferably strengthened by braces 38 which are joined to the lower portion of intermediate portion 20 of frame 16. Height adjusting rear wheel means are connected to a frame 16. The wheel means include a wheel axle 40, spaced wheels 42 rotatably mounted on axle 40, and spaced transversely extending axle support means 44 which is secured at one end to axle 40 and pivotally connected at the other end 45 to the frame 16. Preferably a cross bar 46 is secured across arms 44 to provide additional strength. A hydraulic cylinder 48 is pivotally mounted on the rear portion 22 of the frame between the rearwardly extending members 34. Cylinder 48 has a piston rod 49 which is pivotally secured to the cross bar 46 joined to arms 44. It can be seen actuation of cylinder 48 causes pivoting of the rear axle relative to the frame 16 thereby lowering and raising the frame relative to the ground.

As most clearly indicated in FIG. 1, an adjustable bottom means is provided on the intermediate portion 20 of frame 16. The bottom means has a flat floor 50 having mounted on the leading edge thereof an inclined hardened steel blade 52. Side plates 54 are joined to the opposite side edges of floor 50. Preferably side plates 54 have an upwardly extending projection 55 adjacent the leading edge of the floor 50. A suitable means, such as a hinge or the like, pivotally joins the rear end of floor 50 to the lower rear edge of wall 28 of the intermediate portion 20 of frame 16. A suitable power means is provided for raising and lowering the blade 52 mounted on the front leading edge of floor 50. The power means can be any suitable type of mechanism such as cables, cylinders, screws or the like. Preferably the power means consists of two hydraulic cylinders 56 pivotally mounted at one end to the intermediate portion 20 of frame 16, and with the piston rods 57 pivotally secured to the upwardly extending projections 55 of plates 54. It can be seen that actuation of cylinders 56, which are preferably two-way cylinders, positively lowers and raises the blade 52 on the front leading edge of floor 50. The depth of the cut of soil can thereby be controlled by cylinders 56.

An inclined elevator conveyor 60 is mounted on the adjustable bottom 50 of the intermediate portion 20 of the frame 16. The conveyor 60 has a first roller 61 mounted adjacent blade 52 and generally parallel thereto, and a second roller 62 mounted upwardly and rearwardly of roller 61. A conveyor chain 64 having spaced blade elements is operatively disposed over rollers 61 and 62. An inclined floating flat surface 66 is disposed beneath elevator 60 in spaced relation to the conveyor belt 64. A suitable power means (not illustrated) is used to move conveyor belt 64 so that the blade elements on the lower side adjacent the inclined surface 66 are moved upwardly. This power means can be any suitable type of means such as an electric motor, a fluid motor, drive shafts, or the like. The motor will preferably be used to rotate the upper roller 62 so that the conveyor belt on the lower side is pulled upwardly. In operation the apparatus is pulled by a suitable pulling vehicle with the blade 52 disposed beneath the surface of the soil. The apparatus can however be self-propelled by suitable modifications if desired. The speed of the conveyor 60 is adjusted so that it will break up and move earth or soil and the like upwardly supported on upwardly sloping surface 66 and be conveyed over the upper rear end thereof. This arrangement of a conveyor disposed adjacent the leading edge of blade 52 enables the apparatus of my invention to handle practically any type of soil including heavy damp earth such as sticky clay, etc.

A transverse horizontally disposed conveyor 70 is disposed generally parallel to floor 50 and positioned behind the upper rear end of surface 66. The conveyor 70 is arranged so that soil can be delivered by the conveyor 60 to same. The conveyor 70 is preferably of such a length that it extends slightly beyond the sidewalls 24 of the intermediate portion 20 of frame 16. Transverse conveyor 70 has rollers 72, and a conveyor belt 74 disposed thereover. A suitable power means is provided for moving the conveyor belt 74 of conveyor 70, preferably in either direction so that materials delivered thereon can be moved either to the right or to the left. The conveyor belt is preferably a belt made of rubber and/or fabric which is tough enough to handle the material being delivered thereon by the conveyor 60.

Two transverse outwardly extending delivery conveyors 80 are secured to the intermediate portion 20 of frame 16 in a position to receive material delivered from conveyor 70. If desired the terracing apparatus of my invention can be provided with only a single delivery conveyor 80. The delivery conveyor 80 is preferably pivotally mounted to the intermediate portion 20 of frame 16 so that they can be moved upwardly out of the way when not in use. A preferred embodiment of the conveyor 80 is illustrated in detail in FIGS. 11–13 of the drawings. The conveyor 80 has two parallel bars 82 with a first roller 84 mounted at one end, and a second roller 86 mounted on the other opposite end. The parallel bars are joined with cross members 83 to form a rigid frame supporting the rollers 84 and 86. Positioned in the center of bars 82 is a third roller 88. A conveyor belt 90 is disposed over rollers 84, 86 and 88. In order for the conveyor to operate efficiently the driving roller, when there is only one driving roller, should be located so that the portion of the conveyor belt carrying the material is pulled toward the roller. This would normally entail mounting the power means for rotating the conveyor belt on the outer end. Frequently this is not desirable since the additional weight of the motor makes the conveyor rather unwieldy and cumbersome. In the embodiment 80 of the conveyor illustrated in FIGS. 11 and 13 a modification is provided making it possible to mount a motor 92 adjacent the frame of the terracing apparatus. A first pulley 94 is mounted in driving relation on the shaft supporting roller 84. A second pulley 96 is mounted in driving relation on the shaft supporting roller 86. Pulleys 98 and 99 are mounted in driving relation on the shaft supporting roller 88. A first belt 100 is disposed over pulley 94 and 98 to provide a driving relationship therebetween. A second belt 102 is disposed over pulleys 96 and 99 to provide a driving relationship for roller 86. It can be seen that rotation of roller 84 by motor 92 will also cause rollers 86 and 88 to rotate in driving relationship. The conveyor 80 is pivotally connected to the frame 16 by bar 104 which is positioned in apertures in bifurcated portions 106. The extending portions of bars 82 are provided with aperture 107 which also receive bar 104 thus joining conveyor 80 to the frame 16 in pivoted supporting relation.

It is understood that the means for rotating the various conveyors can be any suitable type of power means such as electric motors, fluid motors, drive shafts powered by the pulling vehicle, etc. In use the terracing apparatus 15 is adapted, when drawn by a suitable pulling vehicle, to scrape earth and the like with blade 52, move the earth up the inclined floating surface 66 with the inclined conveyor 60, and deposit same on transverse conveyor 70. The earth is then moved transversely on conveyor 70 to either of the delivery conveyors 80. The earth is then dumped on one of the delivery conveyors 80 where it is moved transversely outwardly to the end thereof and dropped.

Figure 5:
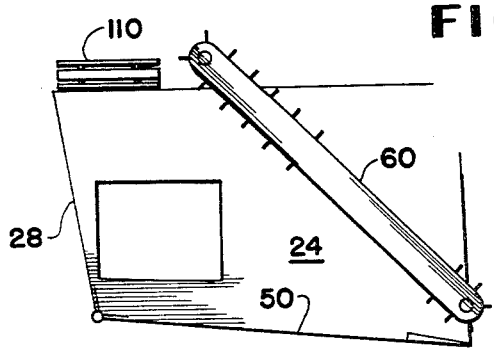
FIG. 5 is a schematic view of another preferred specific embodiment of the earthmoving apparatus of my invention.
Figure 6:
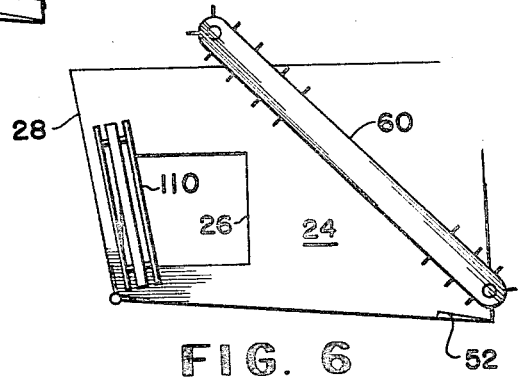
FIG. 6 is a schematic view of still another preferred specific embodiment of the earthmoving apparatus of my invention illustrating the transverse conveyor in an inclined position.
Figure 7:
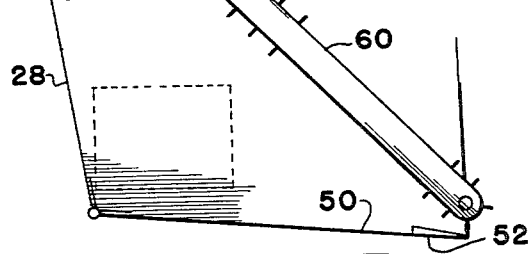
FIG. 7 is a schematic view of still another preferred specific embodiment of my earthmoving apparatus of my invention illustrating the transverse conveyor in an elevated inclined position.

In FIGS. 5–7 there is illustrated various embodiments of the apparatus of my invention in which are provided different arrangements of the inclined conveyor and transverse conveyors. In FIG. 5 is illustrated an embodiment wherein the transverse conveyor 110 is positioned adjacent the top of the intermediate portion of frame 16, and the inclined conveyor 60 is of a length sufficient to move the earth to the conveyor 110. In this embodiment the earth is moved by conveyor 60 to the underside of transverse conveyor 110 where it is thereafter moved outwardly and deposited on the delivery conveyors 80 (not illustrated). If desired, a suitable mounting arrangement can be provided so that the conveyor 110 can be mounted in either the position shown in FIG. 5 or the position shown in FIGS. 1–4. Plates must be provided for covering the openings 26 in the sides of frame 16 when the conveyor is mounted above the frame, as in FIG. 5. In the embodiments shown in FIGS. 5, 6 and 7 the intermediate frame portion 20 of the apparatus can be made in the shape of a bucket or the like in the manner of conventional earth moving apparatus, and the lower floor be adapted to dump the earth from the bucket. This will enable the apparatus to be used alternately as a conventional earthmoving apparatus or as a terracing apparatus.

In FIG. 6 is illustrated still another preferred specific embodiment of my terracing apparatus wherein the transverse conveyor 110 is supported in an inclined position adjacent the rear wall of the intermediate portion of the frame in a position to deliver earth or the like from the inclined conveyor through an opening 26 in the sidewall 24. The earth is delivered by conveyor 110 to a delivery conveyor 80 mounted on the frame and not shown in the schematic view of FIG. 6. The inclined conveyor 60 performs basically the function of breaking up and moving the earth from the vicinity of the blade 52 to the conveyor 110. When the embodiment is desired to be used as an earthmoving apparatus, a plate or the like can be bolted over the opening 26.

In FIG. 7 of the drawings there is illustrated still another preferred specific embodiment of the terracing apparatus of my invention wherein the transverse conveyor 110 is disposed in a generally vertical position adjacent the rear wall 28 adjacent the top thereof. The transverse conveyor is again adapted to receive the earth or the like from the inclined conveyor 60 and deliver same transversely out of the frame to the delivery conveyor 80 (not shown).

Figure 8:
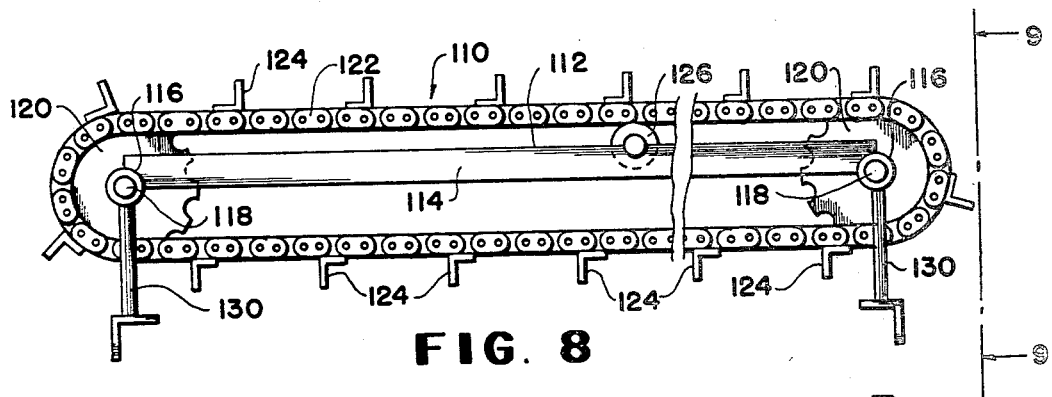
FIG. 8 is a detail view in enlarged section illustrating the specific structure of a preferred specific embodiment of the transverse conveyor of my invention.
Figure 9:
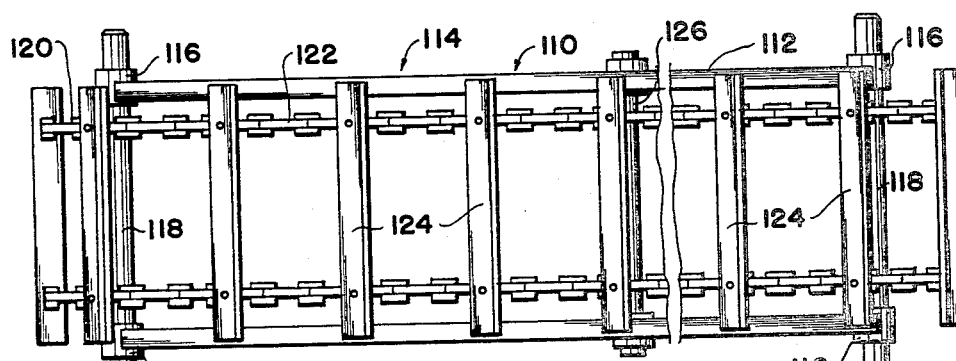
FIG. 9 is a top plan view of the conveyor shown in FIG. 8.
Figure 10:
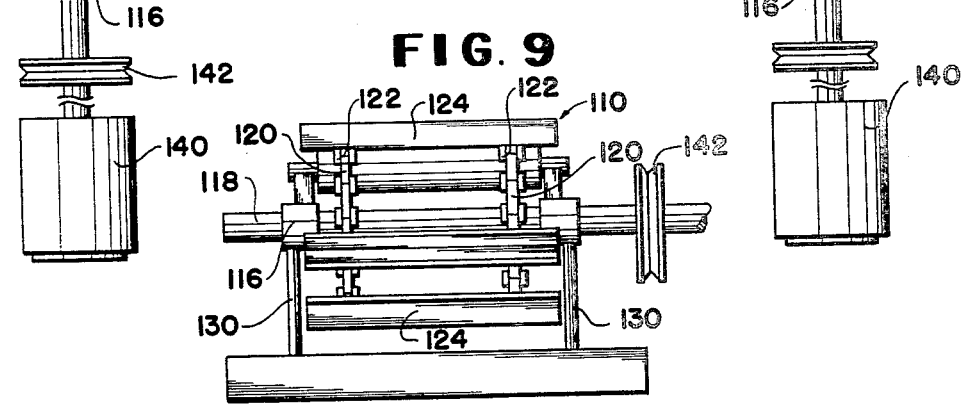
FIG. 10 is an end elevational view of the conveyor shown in FIGS. 8 and 9.

In the preferred specific embodiments illustrated in figures of the drawings, the conveyor 110 is preferably of the construction illustrated in detail in FIGS. 8–10 of the drawings. In the embodiments shown in FIGS. 5–7, the earth is not deposited on the conveyor, but is rather raked transversely of the frame by a conveyor. Thus preferably the construction of the conveyor 110 is different from the type of conveyor 70 illustrated in the embodiment shown in FIGS. 1–4, wherein the dirt is deposited on the conveyor for movement. In conveyor 110 there is provided a frame 112 having longitudinally extending members 114 provided with bearings 116 on the ends thereof. Shafts 118 are disposed in bearings 116 and have mounted thereon sprockets 120 which support the conveyor chain 122. The conveyor chain consists of two spaced chains joined by rigid parallel bars 124. Suitable roller supports 126 can be provided in the intermediate portion of frame 112 to support the conveyor chain if necessary or desirable. The frame 112 is mounted on the frame of the terracing apparatus by suitable support members 130. Power means is provided for moving the conveyor chain 122. The power for moving the conveyor can be provided in any suitable manner. One method can be to supply a motor 140 in driving relation to each of shafts 118. As previously mentioned the portion of the conveyor in contact with the earth should be pulled by the power means. By providing two motors the proper motor can be thereby actuated to achieve this function depending on the direction the conveyor is moved. If desired, however, pulleys or sprockets 142 can be provided on shafts 118 and connected in driving relation with a belt, a chain or the like.

Figure 14:
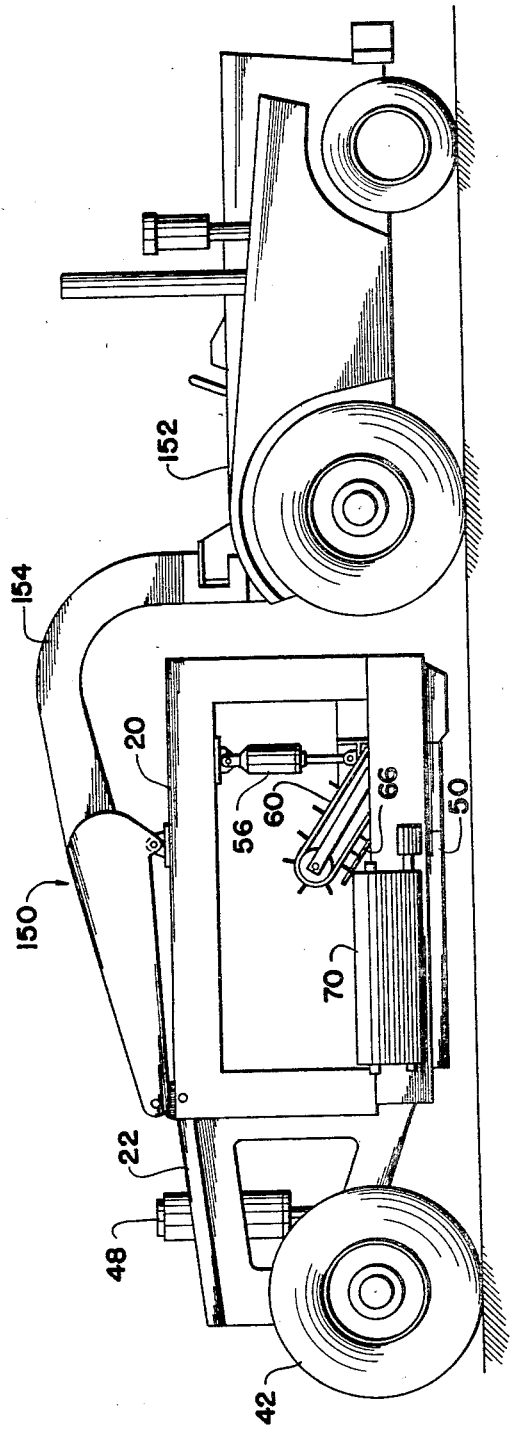
FIG. 14 is a side elevational view of still another preferred specific embodiment of the earthmoving apparatus of my invention shown attached to a pulling vehicle.

Still another preferred specific embodiment of the terracing apparatus 150 is illustrated in FIG. 14 of the drawings. Terracing apparatus 150 has a frame having an intermediate portion 20 and a rear portion 22. Adjustable wheel means is mounted on the rear portion 22 of the frame having generally the same construction described in detail in the description of terracing apparatus 15. Terracing apparatus 150 is likewise provided with a movable floor 50 having a blade on the leading edge thereof, and a pair of cylinders 56 for adjusting the height of the blade relative to the ground and the frame of the apparatus. An inclined conveyor 60 is positioned in spaced relation to incline surface 66 to aid in the delivery of soil to transverse conveyor 70. In this embodiment there is not provided sidewalls enclosing the sides of the intermediate portion 20 of the frame. A very significant difference between the terracing apparatus 150 and terracing apparatus 15 is that the connection between the pulling vehicle 152 is a heavy arched beam 154 secured at one end to the top of intermediate portion 20 of the frame and mounted on the other end on the pulling vehicle.

It will be seen that the objects of this invention have been fully and effectively accomplished. It will be realized, however, that the foregoing specific embodiments have been shown and described only for purposes of illustrating the principles of this invention and should not be construed to unduly limit the claims thereof. While the invention has been particularly shown and described with reference to preferred specific embodiments thereof, it will be understood by those skilled in the art that various changes in form and detail can be made therein without departing from the spirit or scope of the invention.

I claim:

1. A vehicle drawn terracing apparatus comprising, a frame having front, intermediate, and rear portions, said intermediate portion having spaced side walls having rectangular openings therein, and a rear wall, said intermediate portion being open at the top and lower front end, said rear portion of said frame having spaced and parallel rearwardly extending members and transversely extending beams welded therebetween, said front portion of said frame having spaced forwardly extending beams and a transverse beam forming therewith a drawbar for operative connection to a pulling vehicle, height adjusting rear wheel means connected to said frame comprising, a wheel axle, spaced wheels rotatably mounted on said axle, spaced transversely extending axle support arms, each of said support arms secured at one end to said axle and pivotally connected at the other end to said frame adjacent the rear wall of said intermediate portion, a cross bar secured across said arms, a first hydraulic cylinder pivotally mounted on said rear portion of said frame between the rearwardly extending members thereof, means pivotally mounting said first cylinder on said frame, said cylinder having a piston rod pivotally secured to said cross bar, an adjustable bottom means for said intermediate portion of said frame having a flat floor, an inclined hardened steel blade mounted on the front leading edge of said flat floor, side plates joined to the opposite side edges of said floor, means pivotally joining the rear end of said bottom means to the lower edge of said rear wall of said intermediate portion of said frame, power means for raising and lowering the front end of said flat floor, said power means comprising two second hydraulic cylinders, means pivotally mounting said second cylinder in a generally vertical position on said side walls of said intermediate portion of said frame, piston rods in said second cylinders pivotally joined to the respective forward ends of said side plates of said bottom means, an inclined elevator conveyor mounted on said adjustable bottom means of said intermediate portion of said frame comprising, a first roller mounted adjacent said blade and generally parallel thereto, a second roller mounted upwardly and rearwardly of said first roller, a conveyor chain having spaced blade elements operatively disposed over said first and said second rollers, power means for moving said conveyor chain, an inclined floating flat surface disposed beneath said elevator surface pivotally secured at the lower end adjacent to said blade, a transverse horizontal conveyor disposed generally parallel to said floor of said intermediate portion of said frame and spaced therefrom with the ends thereof extending beyond said side walls of said intermediate portion of said frame through said openings, said transverse conveyor having rollers and a conveyor belt and disposed to receive material from said elevator conveyor, means for powering said transverse conveyor, two transverse outwardly extending delivery conveyors positioned on the sides of said frame, means pivotally mounting one end of each of said delivery conveyors to the intermediate portions of said frame below the ends of said transverse conveyor in a position to receive material from said transverse conveyor, each of said delivery conveyors having rollers, a wide conveyor belt entrained thereon, and a power means for moving said belt, said terracing apparatus adapted when drawn by a pulling vehicle to scrape earth and the like with said blade, move the earth up said inclined floating surface with said inclined conveyor, and deposit same on said transverse conveyor, move the earth with the transverse conveyor to either of said delivery conveyors, whereupon the earth is moved transversely outwardly to the end of the delivery conveyor and dropped.

2. A vehicle drawn terracing apparatus comprising, a frame having front, intermediate, and rear portions, said intermediate portion having spaced side walls having openings therein, and a rear wall, said intermediate portion being open at the top and lower front end, said rear portion of said frame having spaced rearwardly extending members, said front portion of said frame having forwardly extending beams forming a drawbar for operative connection to a pulling vehicle, height adjusting rear wheel means connected to said frame comprising, a wheel axle, spaced wheels rotatably mounted on said axle, spaced transversely extending axle support arms, each of said axle support arms secured at one end to said axle and pivotally connected at the other end to said frame, a cylinder means pivotally mounted on said rear portion of said frame, said cylinder having a piston rod pivotally secured to said height adjusting rear wheel means and operative to pivot same relative to said frame, an adjustable bottom means for said intermediate portion of said frame having a flat floor, a blade mounted on the front leading edge of said flat floor, means pivotally joining the rear end of said bottom means to the lower edge of said rear wall of said intermediate portion of said frame, power means for raising and lowering the front portion of said flat floor, said power means comprising two cylinders mounted on said frame having piston rods operatively connected to said flat floor, an inclined elevator conveyor mounted on said bottom means comprising a first roller mounted adjacent said blade, a second roller mounted upwardly and rearwardly of said first roller, a conveyor chain having spaced blade elements operatively disposed over said first and said second rollers, power means for moving said conveyor chain, an inclined floating flat surface disposed beneath said inclined elevator pivotally secured at the lower end adjacent said blade, a transverse conveyor disposed generally parallel to said floor, and spaced therefrom with the ends thereof extending beyond said side walls of said intermediate portions of said frames through said openings, said transverse conveyor having rollers and a conveyor belt and positioned to receive material from said elevator conveyor, means for powering said transverse conveyor, two transverse outwardly extending delivery conveyors on the respective sides of said frame, means pivotally mounting one end of each of said delivery conveyors to the intermediate portions of said frame below the ends of said transverse conveyor in a position to receive material from said transverse conveyor, each of said delivery conveyors having rollers, a wide conveyor belt entrained thereon, and a powering means for moving said belt, said terracing apparatus adapted when drawn by a pulling vehicle to scrape earth or the like with said blade, move the earth up said inclined floating surface with said inclined conveyor and deposit same on said transverse conveyor, move the earth with said transverse conveyor to either of said delivery conveyors, whereupon the earth is moved transversely outwardly to the end of said delivery conveyor and dropped.

3. A vehicle drawn terracing apparatus comprising, a frame having front, intermediate, and rear portions, said intermediate portion having spaced side walls having openings therein, and a rear wall, said rear portion of said frame having rearwardly extending members secured thereto, said front portion of said frame having at least one forwardly extending beam to form a drawbar for operative connection to a pulling vehicle, height adjusting rear wheel means connected to said frame comprising, a wheel axle, spaced wheels rotatably mounted on said axle, axle support means pivotally mounting said wheel means to said frame, power means mounted on said frame and operatively connected to said axle support means for pivoting same to thereby raise and lower said frame relative to the ground, a bottom means for said intermediate portion of said frame having a front leading edge, means pivotally mounting the rear end of said bottom means to said rear wall of said intermediate portion of said frame, a blade mounted on the front leading edge of said bottom means, power means for raising and lowering the leading edge of said bottom means, said power means mounted on said frame, an inclined elevator conveyor mounted on said bottom means having a first roller mounted adjacent said blade, and a second roller mounted upwardly and rearwardly of said first roller, a conveyor chain having spaced blade elements operatively disposed over said first and said second rollers, power means for moving said conveyor chain, an inclined flat surface disposed beneath said inclined elevator in position generally parallel thereto, a transverse conveyor positioned behind and adjacent the upper end of said inclined flat surface, said transverse conveyor having rollers and a conveyor belt and positioned to receive material from said elevator conveyor, means for powering said transverse conveyor, at least one transverse outwardly extending delivery conveyor on said intermediate portion of said frame, said delivery conveyor having spaced rollers, and a wide conveyor belt entrained thereon, and a power means for moving said belt, said terracing apparatus adapted to scrape earth with said blade, move same up said inclined surface with said inclined conveyor and deposit same on said transverse conveyor, and move said earth with said transverse conveyor and said delivery conveyor and drop same.

4. A vehicle drawn terracing apparatus comprising, a frame having front, intermediate, and rear portions, said intermediate portion having spaced side walls with rectangular openings therein, and a rear wall, said rear portion of said frame having spaced rearwardly extending members, said front portion of said frame constituting a drawbar for connection to a pulling vehicle, height adjusting rear wheel means connected to said frame comprising, a wheel axle, spaced wheels rotatably mounted on said axle, axle support means pivotally mounting said axle on said frame, power means mounted on said rear portion of said frame and operatively connected to said axle support means to in use pivot same to thereby raise and lower said frame, bottom means for said intermediate portion of said frame, means pivotally mounting said bottom means to said rear wall of said intermediate portion of said frame, a blade mounted on the front leading edge of said bottom means, power means for raising and lowering the front leading edge of said bottom edge, an inclined elevator conveyor mounted on said bottom means and having a first roller mounted adjacent said blade and a second roller mounted upwardly and rearwardly of said first roller, a conveyor chain having spaced blade elements operatively disposed over said first and said second rollers, power means for moving said conveyor chain, an inclined floor disposed beneath said inclined elevator and positioned generally parallel to same, a transverse conveyor disposed rearwardly of said inclined flat floor and positioned transverse to said frame, said transverse conveyor having rollers and a conveyor belt disposed to receive material from said elevator conveyor, means for powering said transverse conveyor, two transverse outwardly extending delivery conveyors on the sides of said frame positioned to receive material from said transverse conveyor, said deliver conveyors each having rollers, a wide conveyor belt entrained thereon, and a power means for moving said belt, said terracing apparatus adapted to scrape up earth and deliver same transversely via said inclined conveyor, said transverse conveyor, and said delivery conveyors.

5. A terracing apparatus comprising, a frame having front, intermediate, and rear portions, said intermediate portion having spaced portions and a rear transverse portion, said front portion of said frame constituting a drawbar for said apparatus, height adjusting rear wheel means connected to said frame, comprising, a wheel axle, spaced wheels rotatably mounted on said axle, support means for said axle pivotally mounted on said frame, power means mounted on said rear portion of said frame for pivoting said axle support relative to said frame to thereby raise and lower said frame, a bottom means for said intermediate portion of said frame, means movably mounting the rear end of said bottom means on said intermediate portion of said frame, a blade mounted on the front end of said bottom means, power means mounted on said frame for raising and lowering said blade relative to said frame, an inclined elevator conveyor mounted on said bottom means having a first roller mounted adjacent said blade, and a second roller mounted upwardly and rearwardly of said first roller, a conveyor chain having spaced blade elements disposed over said first and said second rollers, power means for moving said conveyor chain, an inclined flat floor disposed beneath and substantially parallel to said inclined elevator, means connecting said flat floor to said bottom means adjacent said blade, a transverse conveyor disposed behind said inclined flat floor, means for powering said transverse conveyor, at least one delivery conveyor extending outwardly and mounted on the intermediate portion of said frame, said delivery conveyor positioned to receive material from said transverse conveyor, means for powering said delivery conveyor, said terracing apparatus adapted to scrape earth or the like with said blade and deliver said earth transversely of said blade with said inclined conveyor, transverse conveyor, and delivery conveyor.

6. The terracing apparatus of claim 5 wherein said transverse conveyor is positioned adjacent the top of said intermediate portion of said frame, and said inclined conveyor is of a length sufficient to move earth or the like to said transverse conveyor for delivery to said delivery conveyor.

7. The terracing apparatus of claim 5 wherein said transerse conveyor is supported in an inclined position adjacent the rear wall of said intermediate portion of said frame in a position to deliver earth or the like from said inclined conveyor through openings in said spaced portion of said intermediate portion.

8. The terracing apparatus of claim 5 wherein said transverse conveyor is disposed in a generally vertical position adjacent the rear wall of said intermediate portion of said frame and adjacent the top thereof, said transverse conveyor adapted to receive earth or the like from said inclined conveyor and deliver same transversely of said frame to said delivery conveyor.

9. The terracing apparatus of claim 5 wherein said delivery conveyor is comprised of a frame having two parallel bars, a first roller rotatably mounted at one end of said frame, a second roller rotatably mounted on the other opposite end of said frame, and a third roller mounted on said frame intermediate said first and said second rollers, a first pulley means mounted in driving relation to said first roller, a second pulley mounted in driving relation on said third roller in alignment with said first pulley, a third pulley mounted in driving relation to said third roller, a fourth pulley mounted in driving relation on said second roller in alignment with said third pulley, a power means for rotating said first roller, a first belt means entrained over said first and said second pulley means, and a second belt means is entrained about said first and said fourth pulley in driving relation, a conveyor belt entrained about said first, second and third rollers, and means pivotally mounting said delivery conveyor to the intermediate portion of said frame.

10. The terracing apparatus of claim 5 wherein said front portion of said frame is comprised of a heavy arched beam secured to the top portion of said intermediate portion of said frame, and a means for connecting the other end of said arched beam to a pulling vehicle.

11. Earthmoving apparatus comprising, a frame having front, intermediate and rear portions, said intermediate portions having spaced portions and a rear transverse portion, said front portion of said frame constituting drawing means for connecting said apparatus to a pulling means, wheel means mounted on said frame, wheel height adjusting means connected to said frame to thereby raise and lower said frame, an adjustable bottom means for said intermediate portion of said frame, a blade mounted on the front end of said bottom means, means mounted on said frame for adjusting the height of said blade relative to said frame, an inclined elevator means mounted on said bottom means and having a first roller means mounted adjacent said blade and a second roller means mounted rearwardly from said first roller means, a conveyor means having spaced blade elements disposed over said first and second roller means, an upwardly inclined floor disposed beneath said elevator and forming an angle with said bottom means and, adjacent said blade, a transverse conveyor positioned rearwardly of said floor, at least one delivery conveyor mounted on the intermediate portion of said frame and extending outwardly, said delivery conveyor being positioned to receive material from said transverse conveyor and transfer same outwardly, said earthmoving apparatus adapted to pick up earth or the like with said blade and inclined conveyor and move same transversely with said transverse conveyor and delivery conveyor.

References Cited

UNITED STATES PATENTS

| | | | |
|---|---|---|---|
| 294,330 | 2/1884 | Otterman | 37—102 |
| 2,291,716 | 8/1942 | Holland | 37—110 X |
| 2,356,797 | 8/1944 | Reany | 37—110 |
| 2,460,764 | 2/1949 | Oklejas | 37—126 |
| 3,210,868 | 10/1965 | Liess | 37—8 |
| 3,314,175 | 4/1967 | Petty et al. | 37—108 |

ABRAHAM G. STONE, *Primary Examiner.*

A. E. KOPECKI, *Assistant Examiner.*